United States Patent [19]

Chopdekar et al.

[11] Patent Number: 5,294,377

[45] Date of Patent: Mar. 15, 1994

[54] PROCESS FOR RESTORATION OF CHEMICAL LIGHTING POTENTIAL OF A CHEMILUMINESCENT LIGHTING SYSTEM

[76] Inventors: Vilas M. Chopdekar, 24 Adele Ct., Edison, N.J. 08817; James R. Schleck, 39 Westlake Ct., Somerset, N.J. 08873

[21] Appl. No.: 9,892

[22] Filed: Jan. 27, 1993

[51] Int. Cl.$^5$ .............................................. C09K 3/00
[52] U.S. Cl. .................................................. 252/700
[58] Field of Search ........................... 252/700; 362/34

[56] References Cited

U.S. PATENT DOCUMENTS

| | | | |
|---|---|---|---|
| 3,948,797 | 4/1976 | Vega | 252/700 |
| 4,017,415 | 4/1977 | Doering | 252/700 |
| 4,086,183 | 4/1978 | Tatyrek | 252/700 |
| 4,313,843 | 2/1982 | Bollyky et al. | 252/700 |
| 5,145,790 | 9/1992 | Mattingly | 436/536 |

*Primary Examiner*—Philip Tucker

[57] ABSTRACT

A process for the restoration of the initial chemical lighting potential of the oxalate component of a chemiluminescent lighting system. The oxalate component comprises an oxalate diester in a first liquid solution which prior to restoration exhibits a failure to produce initial high intensity luminosity upon mixture of the oxalate component with a liquid activator component comprising a peroxide in a second liquid solution. The process comprises contacting the oxalate component with magnesium silicate or calcium silicate for a period of time sufficient to correct the failure and thereafter separating the oxalate component from the selected silicate.

10 Claims, No Drawings

PROCESS FOR RESTORATION OF CHEMICAL LIGHTING POTENTIAL OF A CHEMILUMINESCENT LIGHTING SYSTEM

FIELD OF THE INVENTION

The invention relates to a process for the restoration of the initial chemical lighting potential of the oxalate component of a chemiluminescent lighting system.

BACKGROUND OF THE INVENTION

The chemiluminescent lighting system to which the present invention relates is prepared by mixing two liquid components which are kept separate until light is desired. At the desired time, the two liquid components are mixed and chemical light is produced. Typically, the first component is an oxalate component dissolved in a suitable solvent, while the second component is typically a peroxide compound dissolved in a suitable solvent. Usually the first component includes a fluorescer to heighten the chemiluminescence of the system, and the second component usually includes a catalyst to eliminate the induction period before light is produced upon mixing the two components.

The prior art recognizes that occasionally, light is not produced or, if produced, light is not produced at the desired maximum intensity level, when the first and second components are mixed, even after a prolonged induction period. Such failures are known to occur, even when the fluorescer is present in the first component and the catalyst is present in the second component.

The failure associated with no, or low-level, light production has been traced to an unexplained fault in the oxalate component. Studies have shown that the oxalate component is extremely sensitive to the presence of trace quantities of moisture and by-products remaining with the oxalate after its synthesis, notwithstanding that rigorous efforts are taken during the synthesis of the oxalate component (e.g. an environment of dry argon, purification of reactants and solvents, control of reaction time and temperature, repeated distillation/re-crystallization of the oxalate product, etc.). Therefore, it is desirable to have a process which will quickly and inexpensively insure that the oxalate component may be purified such that the oxalate component will never fail to produce the maximum possible luminosity intensity promptly upon mixing of the first and second components.

U.S. Pat. No. 3,948,797 describes a process for overcoming the oxalate component failure which involves treating the oxalate component at room temperature with an alkali-metal alumino-silicate, i.e. a solid molecular sieve material, e.g. Linde Molecular Sieves—Type 5A or the like. However, this process has several drawbacks: firstly and most importantly, such treatment is not successful in every case; secondly, alkali-metal alumino-silicates are expensive materials; thirdly, treatment times are of the order of several hours and a period of about 16 hours of standing is required before the oxalate component may be decanted from the alkali-metal alumino-silicate.

U.S. Pat. No. 4,017,415 recognizes the drawbacks of the process of the '797 patent and substitutes anhydrous activated alumina for the alkali-metal alumino-silicate. However, anhydrous activated alumina is expensive and the treatment involves a relatively high level of alumina. Moreover, separation of the oxalate component from the alumina entails the use of laborious, time-consuming and expensive filtration methods.

SUMMARY OF THE INVENTION

In contradistinction to the processes of the prior art, the process of the present invention is fool-proof, i.e. treatment is always successful in overcoming any fault with the oxalate component, it utilizes inexpensive materials, i.e. magnesium or calcium silicate, it permits the use of the magnesium or calcium silicate at very low levels, e.g. as low as 0.25 wt. %, based on the weight of the liquid oxalate component, treatment times are very short, e.g. 30 minutes and the liquid oxalate component may be quickly and inexpensively separated from the liquid oxalate component by decantation immediately after the desired treatment time has elapsed.

The invention involves a process for the restoration of the initial chemical lighting potential of the oxalate component of a chemiluminescent lighting system, said oxalate component comprising an oxalate diester in a first liquid solution which prior to restoration exhibits a failure to produce initial high intensity luminosity upon mixture of the oxalate component with a liquid activator component comprising a peroxide in a second liquid solution, which comprises contacting the oxalate component with a solid selected from the group consisting of magnesium silicate and calcium silicate for a period of time sufficient to correct said failure and thereafter separating the oxalate component from said solid.

DETAILS OF THE INVENTION

The oxalate component consists of a solution of an oxalate diester in an organic solvent; preferably the solution also includes a fluorescer. Oxalate components treated in accordance with the present invention are well known in the prior art. Such oxalate diesters and processes for their preparation are set forth in U.S. Pat. Nos. 3,597,362 and 3,749,679. Typical oxalate diesters include bis(2,4,5-trichloro-6-carbopentoxy-phenyl) oxalate, bis(2,4,5-trichloro-6-carbobutoxy-phenyl) oxalate, bis(2,4,5-tribromo-6-carbohexoxyphenyl) oxalate, and the like. Typically, the concentration of the oxalate diester in the oxalate component will range from 0.01M to 1.5M, preferably, 0.03M to 0.3M.

Typical fluorescers that may be included in the liquid oxalate component are those described in U.S Pat. Nos. 3,729,426 and 3,948,797, 4,017,415 and the like, e.g. 9,10-bis(phenylethynyl) anthracene, monochloro and dichloro substituted 9,10-bis(phenylethynyl) anthracenes such as 1,8-dichloro-9,10-bis(phenylethynyl) anthracene, 1,5-dichloro-9,10-bis(phenylethynyl) anthracene, 2,3-dichloro-9,10-bis(phenylethynyl) anthracene, 5,12-bis-(phenylethynyl) tetracene, 9,10-diphenylanthracene, perylene, 16,17-dihexyloxyviolanthrone, rubrene, etc. Useful solvents for dissolving the oxalate diester and fluorescer include benzene, chlorobenzene, toluene, ethylbenzene, o-dichlorobenzene, dimethylphthalate, dibutylphthalate, ethyl benzoate, butyl benzoate, 1,3-butyleneglycol dibenzoate, and the like. The fluorescer concentration will typically range from 0.002M to 0.03M, preferably 0.001M to 0.005M.

The liquid activator component is not treated in accordance with the process of the present invention. As mentioned above, the liquid activator component comprises a peroxide compound dissolved in an appropriate solvent which may be any of those described in U.S. Pat. No. 3,749,679, e.g. tertiary alcohols such as t-butyl alcohol, 3-methyl-3-pentanol, 3,6-dimethyloctanol-3 or an ester such as dimethyl phthalate, or combinations of both. Suitable peroxide compounds are listed in the prior art, e.g. U.S. Pat. No. 3,808,414 and include, e.g. hydrogen peroxide, 6-butylperoxide, peroxybenzoic acid and the like. Typically, the concentration of peroxide compound will be in the range of 0.01M to 3M, preferably 0.10M to 2.0M.

Preferably, the liquid activator component will include a catalyst such as those described in U.S. Pat. No. 3,749,679, e.g. sodium salicylate, tetrabutylammonium salicylate, tetrabutylammonium-2,3,5-trichlorobenzoate, potassium pentachlorophenolate, tetraethylammonium benzoate, and the like dissolved in the same solvents as that described above in respect to the peroxide compounds. The catalyst is usually employed in a concentration in the range of $1 \times 10^{-6}$M to $1 \times 10^{-1}$M, preferably $1 \times 10^{-3}$M to $1 \times 10^{-2}$M.

The solid which is utilized for treating the oxalate component in accordance with the present invention comprises magnesium silicate or calcium silicate. Magnesium silicate is preferred. If calcium silicate is desired to be used, treatment of the oxalate component at temperatures of 40° to 100° C. provide the best results. In the case of magnesium silicate, excellent results are obtained by treatment of the oxalate component at room temperature, but temperatures in the range of 0° to 100° C. may be used, if desired. The concentration of the chosen silicate will range from about 0.2 to 10 wt. %, preferably 1 to 5 wt. %, based on the weight of the oxalate component. The treatment time will vary somewhat, depending on the concentration of the silicate. A treatment time of about 10 minutes to 24 hours, preferably 15 minutes to 1 hour, will be sufficient when employing magnesium silicate in a concentration of 1 to 5 wt. %, based on the weight of the oxalate component.

Magnesium silicate is preferred over calcium silicate since it provides excellent results at room temperature at a lower concentration and within a shorter time frame. Moreover, magnesium silicate is readily commercially available in a prilled or granular form and is very inexpensive. The fact that the magnesium silicate is available in prilled or granular form permits the treated oxalate component to be easily separated from the silicate by decantation with no loss of oxalate component in the filter medium and in a few seconds as compared to alumina oxide.

Throughout the examples, the following procedure was used to test for glow. Offgrade batches of oxalate component were prepared from 90 g bis(2,4,5-trichloro-6-carbopentoxyphenyl) oxalate and 1.1 g 9,10-bis(phenyl-ethynyl) anthracene were added to dibutylphthalate so as to obtain 1 liter of oxalate component. The oxalate diester was synthesized by the method set forth in U.S. Pat. No. 3,749,679. Samples from various batches of oxalate components were screened in order to find those batches which would exhibit the characteristic initial luminosity failure associated with an unacceptable oxalate component. These were the batches which were utilized in the examples.

The liquid activator component was prepared by preparing a mixture of 800 g dimethylphthalate and 200 g t-butyl alcohol. To this mixture were added 60 g of a 50 wt. % aqueous solution of hydrogen peroxide and 0.16 g sodium salicylate. The resultant mixture was then stirred to obtain a clear solution.

The offgrade oxalate component was treated with the indicated silicate as set forth in the examples. The offgrade oxalate component and the silicate were stirred for the indicated period of time and temperature with an argon or nitrogen blanket present during the treatment step. Two parts of the treated oxalate component were added to one part of the liquid activator component and the degree of glow was assessed by visual observation.

EXAMPLE 1

This example was carried out to determine the range of amounts of magnesium silicate which would be effective in treating otherwise unacceptable oxalate component. A one-liter, three-neck flask was set up with a condenser, thermometer and condenser and purged with argon. The flask was charged with 400 g oxalate compound previously found to be unacceptable (i.e. no glow when mixed with liquid activator) and 20 g of prilled magnesium silicate and stirred for 2 hours while maintaining the argon blanket. The treated oxalate component was then decanted. 10 g of the treated oxalate component were mixed with 5 g liquid activator component and an immediate bright glow was observed; two hours later, the glow was still bright. Thus, prilled magnesium silicate at the 5 wt. % level produced very satisfactory results.

The above procedure was repeated with 8 g (corresponding to 2 wt. %) prilled magnesium silicate with stirring for about 2 hours. The results were identical, showing that prilled magnesium silicate at the 2 wt. % level produced very satisfactory results. The procedure was repeated with 4 g (corresponding to 1 wt. %) prilled magnesium silicate and stirred for 10 hours, 2 g (corresponding to 0.5 wt. %) prilled magnesium silicate and stirred for 10 hours and 1 g (corresponding to 0.25 wt. %) prilled magnesium silicate and stirred for 18 hours. In all cases, the results were identical to those observed at the 5 wt. % and 2 wt. % levels.

EXAMPLE 2

The procedure outlined in Example 1 was followed in this Example, except that 10 g (corresponding to 2 wt. %) of powdered calcium silicate were substituted for the prilled magnesium silicate. After stirring the oxalate component for 2 hours with the calcium silicate under a nitrogen blanket, the treated oxalate component was filtered off; upon mixing the treated oxalate component with the liquid activator component in a 2:1 ratio, an instantaneous bright glow was observed, thus demonstrating the suitability of the process when it is carried out with calcium silicate.

EXAMPLE 3

Example 1 was repeated using 1 g (corresponding to 0.25 wt. %) of powdered, rather than prilled, magnesium silicate. After stirring the oxalate component with the powdered magnesium silicate under a nitrogen blanket for 0.5 hour, the treated oxalate component was filtered off; upon mixing the treated oxalate component with the liquid activator component in a 2:1 ratio, an instantaneous bright glow was observed. This demonstrates that even very low levels of magnesium silicate and relatively short treatment times will provide satisfactory results.

EXAMPLE 4

In this Example, comparisons were made between treatment of unacceptable oxalate component using magnesium silicate in accordance with the present invention and treatment using molecular sieves, and activated alumina, in accordance with U.S. Pat. Nos. 3,948,797 and 4,017,415, respectively. The treatments and glow observations were carried out in accordance with the procedures outlined in Example 1; the results are shown in Table I set forth below.

TABLE I

| Treatment Agent and wt. % | Treatment time, hours | Glow Observations at Indicated Time | | | |
|---|---|---|---|---|---|
| | | 0 min. | 10 min. | 60 min. | 240 min. |
| none | — | no glow | moderate glow | weak glow | very weak glow |
| molecular sieve, 2 wt. % | 0.5 | no glow | moderate glow | weak glow | very weak glow |
| molecular sieve, 2 wt. % | 2 | no glow | moderate glow | weak glow | very weak glow |
| molecular sieve, 5 wt. % | 0.5 | no glow | moderate glow | weak glow | very weak glow |
| molecular sieve, 5 wt. % | 2 | no glow | moderate glow | weak glow | very weak glow |
| activated alumina*, 0.25 wt. % | 0.5 | no glow | moderate glow | weak glow | very weak glow |
| activated alumina*, 0.25 wt. % | 2 | no glow | moderate glow | weak glow | very weak glow |
| activated alumina*, 1 wt. % | 0.5 | very weak glow | moderate glow | weak glow | very weak glow |
| activated alumina*, 1 wt. % | 2 | weak glow | moderate glow | weak glow | very weak glow |
| activated alumina*, 2 wt. % | 0.5 | bright glow | moderate glow | weak glow | very weak glow |
| magnesium silicate*, 0.25 wt. % | 0.5 | bright glow | moderate glow | weak glow | very weak glow |
| magnesium silicate*, 1 wt. % | 0.5 | bright glow | moderate glow | weak glow | very weak glow |
| magnesium silicate**, 2 wt. % | 0.5 | bright glow | moderate glow | weak glow | very weak glow |
| magnesium silicate**, 5 wt. % | 0.5 | bright glow | moderate glow | weak glow | very weak glow |

*very fine powder
**prilled

EXAMPLE 5

The purpose of this example was to determine the effect trace impurities present in treatment agents (e.g. molecular sieves, activated alumina, magnesium silicate, etc.) might have on chemiluminescence of the oxalate component. In this example, the procedure outline above in Example 1 for testing glow was followed, except that the catalyst, sodium salicylate, was omitted from the liquid activator component. For the purposes of this Example 5, the term "Untreated" means that an otherwise unacceptable oxalate component was not treated with any treatment agent, but was mixed (in a 2:1 ratio) with the liquid activator component containing no sodium salicylate. In those cases where treatment took place, the otherwise unacceptable oxalate was allowed to remain in contact with the treatment agent for 60 minutes and then separated and mixed (in a 2:1 ratio) with the liquid activator component containing no sodium salicylate. The term "Control" means that the oxalate component was fault-free as synthesized (treatment with a treating agent was not required to produce an acceptable glow when such oxalate component was mixed with a liquid activator component containing sodium salicylate). In all cases, glow observation were made after 0 minutes and after 60 minutes after admixture of the oxalate and liquid activator components. The results, as set forth in Table II below, show that the treatment agent does not introduce any trace impurities into the chemiluminescent lighting system which would otherwise have an adverse effect on the degree of glow.

TABLE II

| Treatment Agent | Glow at 0 min. | Glow at 60 minutes |
|---|---|---|
| Untreated | none | very, very weak |
| 5 wt. % molecular sieves | none | very, very weak |
| 0.25 wt. % activated alumina | none | very, very weak |
| 2 wt. % activated alumina | none | very, very weak |
| 0.25 wt. % magnesium silicate | none | very, very weak |
| 1 wt. % magnesium silicate | none | very, very weak |
| 2 wt. % magnesium silicate | none | very, very weak |
| Control | none | very, very weak |
| Control + 2 wt. % magnesium silicate | none | very, very weak |

We claim:

1. A process for the restoration of the initial chemical lighting potential of the oxalate component of a chemiluminescent lighting system, said oxalate component comprising an oxalate diester in a first liquid solution which prior to restoration exhibits a failure to produce initial high intensity luminosity upon mixture of the oxalate component with a liquid activator component comprising a peroxide in a second liquid solution, which comprises contacting the oxalate component with a solid comprising magnesium silicate for a period of time sufficient to correct said failure and thereafter separating the oxalate component from said solid.

2. The process of claim 1 wherein the amount of magnesium silicate used is about 0.25 to 10 wt. %, based on the weight of the oxalate component.

3. The process of claim 2 wherein the amount of magnesium silicate used is in the range of 1 to 5 wt. %, based on the weight of the oxalate component.

4. The process of claim 1 wherein the oxalate component is separated from the solid by decantation.

5. The process of claim 1 wherein the oxalate component comprises bis(2,4,5-trichloro-6-carbopentoxy-phenyl) oxalate dissolved in dibutylphthalate solvent.

6. The process of claim 1 wherein the oxalate component further comprises a fluorescer in the first liquid solution.

7. The process of claim 6 wherein the fluorescer comprises 9,10-bis(phenylethynyl) anthracene dissolved in dibutylphthalate solvent.

8. The process of claim 1 wherein the peroxide compound comprises hydrogen peroxide.

9. The process of claim 1 wherein the liquid activator component further comprises a catalyst in the second liquid solution.

10. The process of claim 9 wherein the catalyst comprises sodium salicylate.

* * * * *